(12) United States Patent
Neel

(10) Patent No.: US 9,834,895 B2
(45) Date of Patent: Dec. 5, 2017

(54) SYSTEMS AND METHODS FOR MIXING AN ASPHALT COMPOSITION

(71) Applicant: ENERGY CREATES ENERGY LLC, Kansas City, MO (US)

(72) Inventor: Jack Elvis Neel, St. Joseph, MO (US)

(73) Assignee: Energy Creates Energy LLC, Kansas City, MO (US)

( * ) Notice: Subject to any disclaimer, the term of this patent is extended or adjusted under 35 U.S.C. 154(b) by 0 days.

(21) Appl. No.: 15/393,536

(22) Filed: Dec. 29, 2016

(65) Prior Publication Data

US 2017/0107675 A1  Apr. 20, 2017

Related U.S. Application Data

(63) Continuation of application No. 13/474,634, filed on May 17, 2012, now Pat. No. 9,550,311.

(60) Provisional application No. 61/486,801, filed on May 17, 2011.

(51) Int. Cl.
| | |
|---|---|
| *E01C 19/00* | (2006.01) |
| *E01C 19/10* | (2006.01) |
| *C04B 26/00* | (2006.01) |
| *E01C 19/05* | (2006.01) |
| *E01C 7/24* | (2006.01) |

(52) U.S. Cl.
CPC ........ *E01C 19/1054* (2013.01); *C04B 26/003* (2013.01); *E01C 7/24* (2013.01); *E01C 19/05* (2013.01); *E01C 19/1077* (2013.01)

(58) Field of Classification Search
CPC ............. E01C 19/1054; E01C 19/1036; E01C 19/1059; E01C 19/05; C04B 26/003
See application file for complete search history.

(56) References Cited

U.S. PATENT DOCUMENTS

| | | | |
|---|---|---|---|
| 4,706,893 A | * | 11/1987 | Brock ................. E01C 19/1036 106/282 |
| 5,164,158 A | | 11/1992 | Brashears et al. |
| 7,950,601 B2 | | 5/2011 | Watts |

(Continued)

OTHER PUBLICATIONS

"Portland's Northwest Shingle Recyclers grind oil from shingles for reuse as asphalt for roads" by Carrie Sturrock published Apr. 15, 2011 http://blog.oregonlive.com/pdxgreen/2011/04/portlands_northwest_shingle_re.html.*

(Continued)

*Primary Examiner* — Tony G Soohoo
*Assistant Examiner* — Anshu Bhatia
(74) *Attorney, Agent, or Firm* — Hovey Williams LLP

(57) ABSTRACT

A system and method for monitoring and adjusting a constant flow asphalt manufacturing process includes monitoring the ratios of recycled material to virgin material to minimize costs and adjusting the mixture in real time. Pulverized asphalt shingle (PAS) material may be used as a source of recycled asphalt oil and fed to a mixing drum with real-time monitoring while making real-time adjustments to supplement the asphalt with new asphalt oil to the mixer. The systems and methods may also be used for monitoring, metering, and supplementing recycled aggregate from recycled asphalt pavement (RAP) with new aggregate. The systems and methods may use one or more processors or programmable logic controllers (PLC) to meter the addition of new materials.

19 Claims, 4 Drawing Sheets

(56) References Cited

U.S. PATENT DOCUMENTS

| | | |
|---|---|---|
| 9,403,167 B2 | 8/2016 | Watts |
| 2002/0191481 A1 | 12/2002 | Cox et al. |
| 2009/0292572 A1 | 11/2009 | Alden et al. |

OTHER PUBLICATIONS

Office Action in related U.S. Appl. No. 13/474,634, dated Oct. 6, 2015, 8 pages.

* cited by examiner

SYSTEMS AND METHODS FOR MIXING AN ASPHALT COMPOSITION

RELATED APPLICATIONS

This application is a continuation of U.S. patent application Ser. No. 13/474,634, filed May 17, 2012, which is based on and claims priority to U.S. Provisional Application Ser. No. 61/486,801 filed May 17, 2011, the entire contents of which are herein incorporated by reference.

FIELD OF THE INVENTION

Aspects of the systems and methods disclosed herein relate to a real-time monitoring and metering of at least one component in a constant flow process for manufacturing asphalt.

BACKGROUND

In order to minimize costs and the resources necessary to produce new asphalt, recycled asphalt pavement (RAP) may be processed to retrieve aggregate material and asphalt cement or asphalt oil contained therein. In addition, asphalt shingles that make up a significant portion of residential roofing materials may also be recycled to produce new asphalt. During the recycling process, some portion of the RAP and the recycled shingles may be recovered as an aggregate material or as asphalt oil.

During the recycling process, the oil content retrieved from the recycled material is not always uniform; therefore, additional virgin oil must be incorporated into the new asphalt. As the oil content of new asphalt is regulated and required to fall within specific ranges, the oil content of the new asphalt is sometimes examined after it is manufactured to determine its conformity to the specified ranges. The lack of uniformity in the amount of oil recovered from recycled materials may result in inadequate new asphalt that may bring about excessive fines and penalties for asphalt producers. Therefore, a need exists for a system to monitor the oil content provided by recycled materials and to adjust, automatically, the incorporation of virgin oil as necessary, in real time.

SUMMARY

Systems and methods are provided for monitoring and adjusting the addition of various asphalt components in near real-time. According to one aspect, a system for monitoring and adjusting an asphalt mixture includes at least one processor and a database to store component amount data for a total oil amount and a total aggregate amount for an asphalt mixture. The total oil amount includes a first oil component and a second oil component. The system also includes an asphalt mixture application executable by the at least one processor to receive measurement data of the first oil component added to the asphalt mixture from a sensor. The measurement data identifies a first amount of the first oil component. The application also compares the measurement data to the component parameter data for the asphalt mixture, determines the second amount of a second oil component based upon the measurement data, and transmits an output signal to a metering device in fluid communication with a vessel containing the second oil component, wherein the second amount of the second oil component is added to the asphalt mixture in near real-time.

In another aspect, a system for monitoring and adjusting an asphalt mixture includes at least one processor and a database to store component amount data for a total aggregate amount and a total oil amount for an asphalt mixture. The total aggregate amount includes a first aggregate component and a second aggregate component. The system also includes an asphalt mixture application executable by the at least one processor to receive measurement data of the first aggregate component added to the asphalt mixture from a sensor. The measurement data identifies a first amount of the first aggregate component. The application also compares the measurement data to the component parameter data for the asphalt mixture, determines the second amount of a second aggregate component based upon the measurement data, and transmits an output signal to a metering device in fluid communication with a vessel containing the second aggregate component, wherein the second amount of the second aggregate component is added to the asphalt mixture in near real-time.

In yet another aspect, a method for monitoring and adjusting an asphalt mixture includes, at at least one processor, receiving measurement data of a first oil component of an asphalt mixture from a sensor. The measurement data identifies a first amount of the first oil component. The method also includes comparing the measurement data to a desired total oil amount, where the desired total oil amount includes the first oil component and a second oil component. Further, the method includes determining a second amount of the second oil component based upon the measurement data and transmitting an output signal to a metering device in communication with a vessel containing the second oil component, wherein the output signal adjusts an output of the second oil component in near real time.

In one aspect, a method for monitoring and adjusting an asphalt mixture includes, at at least one processor, receiving measurement data of a recycled oil component of an asphalt mixture from a sensor. The measurement data identifies a first amount of the recycled oil component. The method also includes comparing the measurement data to a desired total oil amount, where the total oil amount includes the recycled oil component and a virgin oil component. If the first amount of the recycled oil component is less than the total oil amount, the method includes determining a second amount of the virgin oil component based upon the measurement data, wherein the total amount of the total oil component equals the sum of the first amount and the second amount, and transmitting a first signal to a metering device in fluid communication with a vessel containing the virgin oil component. The first signal causes the second amount of the virgin oil component to be added to the asphalt mixture in near real time. Alternately, if the first amount of the recycled oil component is equal to the total oil amount, the method includes transmitting a second signal to the metering device in communication with the vessel containing the virgin oil component, the second signal stopping the addition of the virgin oil component.

In yet another aspect, a system for monitoring and adjusting an asphalt mixture includes at least one processor and a database to store asphalt mixture amount data for a total oil amount and a total aggregate amount for an asphalt mixture. The total oil amount includes a recycled oil amount and a virgin oil amount and the total aggregate amount includes a recycled aggregate amount and a virgin aggregate amount.

The system also includes a asphalt mixture application executable by the at least one processor to: receive first measurement data of the recycled oil amount added to the asphalt mixture from a first sensor, receive second measurement data of the recycled aggregate amount added to the asphalt mixture from a second sensor, compare the first measurement data to the total oil amount, and compare the second measurement data to the total aggregate amount. The asphalt mixture application also determines a virgin oil amount to be added to the asphalt mixture based on the first measurement data and determines a virgin aggregate amount to be added to the asphalt mixture based on the second measurement data. The asphalt mixture application transmits a virgin oil output signal to a first metering device in communication with a first vessel containing virgin oil, where the virgin oil amount is added to the asphalt mixture in near real-time, and transmits a virgin aggregate output signal to a second metering device in communication with a second vessel containing virgin aggregate, where the virgin aggregate amount is added to the asphalt mixture in near real-time.

DETAILED DESCRIPTION

Figure 1A:
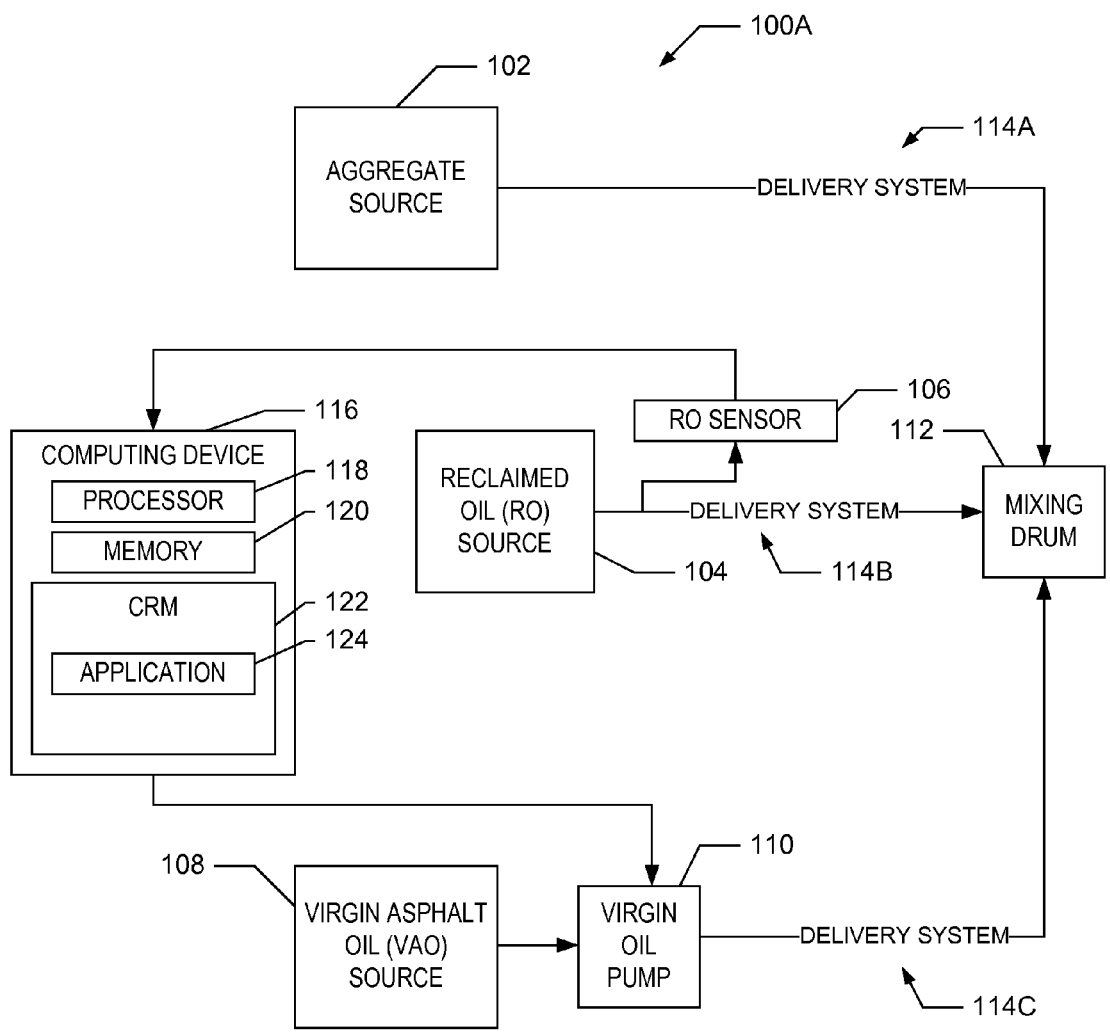
FIG. 1A is a block diagram of an automated asphalt component mixing system according to one aspect.

The asphalt component mixing systems and methods generally relate to the preparation and mixing of an asphalt composition. An asphalt composition may be produced from a mixture of a number of components, including but not limited to an aggregate and asphalt oil. Different compositions may include different numbers and ratios of the constituent components. For example, one asphalt composition may be a particular ratio of aggregate to oil (e.g. 60% aggregate to 40% oil), while another asphalt composition may have a ratio of 75% aggregate to 25% oil. Other asphalt compositions may include additional components, such as one or more additives, and may have different ratios for each component. The oil portion may be divided between virgin oil and recycled oil material such that a portion of the total oil is from virgin oil and another portion of the total oil is from recycled oil material.

In particular, the system may be used in a constant-flow manufacturing process where the amount of various components within an asphalt mixture that will become an asphalt composition, may be adjusted in real-time. For example, the system may be used to monitor and manipulate the addition of recycled asphalt shingle (RAS) material derived from recycled roofing shingles or other sources to the mixture, as well as providing real-time monitoring and metering of new or virgin asphalt oil (VAO) to the mixture.

In one aspect, the amount of VAO added to the mixture is calculated and metered based, at least in part, on the amount of recycled oil derived from the RAS material, or recycled asphalt pavement (RAP) material, and/or another recycled oil material. In addition, the system and process may also provide real-time monitoring and metering of RAS material and/or RAP material derived from previously manufactured asphalt shingles, or pavement to the mixture, as well as monitoring and metering virgin aggregate additions to the mixture. In one aspect, RAP material may be recycled to reclaim oil and aggregate materials. As such, the RAP materials may be included in new asphalt mixtures as only a reclaimed oil source, only a recycled aggregate source, or both.

As the actual amount of recycled oil, and in one optional embodiment, recycled aggregate, that may be reclaimed from the RAS material, the RAP material, and/or another recycled oil material is not uniform and may vary at any given moment in the constant-flow process of manufacturing new asphalt, the system and process allows for the automatic addition of precise quantities of VAO to the asphalt mixture. In one aspect, the addition of VAO to an asphalt mixture composition is achieved using programmable logic controllers (PLC) or other computing devices to control the operation of one or more pumps in fluid communication with one or more vessels containing VAO based on sensor data identifying the amount of recycled oil material delivered for the asphalt mixture composition. In various other aspects, the system may be incorporated into new or existing asphalt manufacturing facilities.

In one aspect, as shown in FIG. 1A, the asphalt mixing system 100A includes a aggregate source 102, a reclaimed oil (RO) source 104 in communication with an reclaimed oil (RO) sensor 106, a VAO source 108 in communication with a VAO pump 110, a mixing drum 112, various delivery systems 114A-114C, and a computing device 116.

The aggregate source 102 includes aggregate material. Aggregate generally refers to a broad category of coarse particulate material as understood by one having ordinary skill in the art. The aggregate may include sand, gravel, crushed stone, slag, recycled concrete, and/or geosynthetic aggregates, among others. The asphalt mixing system 100 may be used with any suitable aggregate material. Although shown as a single source, the aggregate source 102 may be a single source or distributed sources, such as one or more cold-feed bins, storage bins, storage drums, and/or storage silos. The aggregate source 102 may also include aggregate obtained directly from a primary aggregate source, such as a quarry or an off-site recycling facility. In one embodiment, the aggregate includes recycled aggregate separated from RAP or other recycled material The RO source 104 includes asphalt oil and/or asphalt oil material recovered from RAP, the RAS material, and/or another recycled or reclaimed oil material. The RO material is some portion (including from zero to 100%) of the total asphalt oil delivered to the mixing drum 112. An amount of RO and an amount of VAO make up a total amount of asphalt oil delivered to the mixing drum. For example, asphalt oil may be extracted from the RAP and separated from the recycled aggregate. Similarly, asphalt oil may be derived or extracted from ground asphalt shingles. Although shown as a single source, the RO source 104 material may be a single source or distributed sources, such as one or more cold-feed bins, storage bins, storage drums, and/or storage silos. The RO source 104 may also refer to any of the various tools and machinery used for recycling pavement, shingles, and/or another asphalt oil material.

The RO source 104 is in communication with the RO sensor 106 that measures the amount of RO that is being delivered to the asphalt mixture. The RO sensor 106 may be, for example, a weight-determining sensor, such as a load cell, a weigh depletion sensor, a volume-determining sensor, or another sensor to determine the amount of reclaimed oil material delivered to the mixing drum 112. In one aspect, the RO sensor 106 measures the weight of the reclaimed oil material from the RO source delivered to the mixing drum 112. In another aspect, the RO sensor 106 measures the volume of liquid reclaimed oil material delivered to the mixing drum 112. In another aspect, the RO sensor 106 determines the volume, weight, or other parameter of the reclaimed oil material blown, pumped, or otherwise delivered to the mixing drum 112.

In one aspect, the delivery systems 114A and 114B include at least one sensor or device to weigh the material transported by the delivery systems. For example, one or more transducers, such as load cells, may be incorporated into or at least in communication with the delivery systems 114A and 114B. As such, the load cells, can measure the weight of the materials transported by the delivery systems 114A and 114B. One or more load cells may be placed along the entire length of the delivery systems 114A-114B, or alternately, the one or more load cells may be positioned at particular locations along the delivery systems.

In other aspects, the RO may not be completely separate from recycled aggregate material. For example, asphalt oil may not be completely separated from aggregate or other material, including dust, derived from recycled shingles. As the oil content of the roofing shingles may be known or determined prior to recycling, the RO sensor 106 may determine the weight of the oil-containing RAS material that is being delivered to the mixing drum 112. In various other aspects, the RO sensor may capture other parameters of the RO material. As such, the RO sensor 106 captures data relevant to determining the amount of RO provided to the mixing drum 112.

The VAO source 108 is a source of virgin asphalt oil used in the manufacture of new asphalt. The VAO is some portion (including from zero to 100%) of the total asphalt oil delivered to the mixing drum 112. An amount of VAO and an amount of RO make up a total amount of asphalt oil delivered to the mixing drum. In one example, the VAO is used to supplement and/or augment the volume of RO material delivered to mixing drum 112.

The VAO pump 110 controls the amount of VAO delivered to the mixing drum 112 from the VAO source 108. The VAO pump 110 can increase or decrease the amount of VAO delivered to the mixing drum 112 in real-time. For example, an asphalt mixture having an oil content of approximately 20% may be composed of 80% aggregate, 10% RO, and 10% virgin oil. The virgin oil may used or the amount of virgin oil may be increased, if the oil content of the recycled oil material is non-uniform, unknown, insufficient, or if is determined the actual amount of RO being delivered to the mixing drum 112 is less than the calculated amount of RO that was initially to be delivered to the mixing drum. The actual ratio of RO to VAO can be varied in real time by the asphalt mixing system 100A.

The various input components used in an asphalt mixture are delivered to the mixing drum 112 by delivery systems 114A-C. The delivery systems 114A-C may be any mechanism suitable for transporting the materials from the respective sources 102, 104, and 108 to the mixing drum 112, such as one or more of an auger conveyor, a pneumatic conveyor system, a conveyor belt, a pump, one or more pipes, or one or more other delivery mechanisms. For example, the delivery systems 114A and 114B may include one or more conveyor belts and/or one or more auger conveyors. Similarly, the delivery system 114C may be any delivery system suitable for transporting the VAO, including but not limited to various lengths of piping. For example, the delivery system for the VAO may be configured for transferring liquids. Other delivery systems for transporting materials and systems for holding and/or storing materials may be used, including but not limited to hoppers.

In one embodiment, the operation of the VAO pump 110, and therefore the amount of VAO provided to the asphalt mixture, is controlled by the computing device 116 or another control system. In operation, the computing device 116 receives data from various components, such as the RO sensor 106, to continuously monitor the amounts of materials delivered to and/or added to the mixing drum 112. In response to changes in the amount of materials delivered to and/or added to the mixing drum 112, the computing device 116 recalculates the amount of the other materials, in real-time, to be delivered to and/or added to the mixing drum to achieve a particular product mixture.

For example, the computing device 116, may receive input from the RO sensor 106 to determine the actual amount of RAS material or other RO material being delivered to and/or added to the mixing drum 112. As the computing device 116 determines the amount of the RAS material that is delivered to the mixing drum 112, it simultaneously adjusts the pump 110 to modify and meter the flow of VAO delivered from the VAO source 108 to the mixing drum 112. The computing device 116 therefore, causes the amount of VAO pumped in to the mixing drum 112 to increase or decrease depending on the actual, measured amount of RAS material or other RO material that is delivered to and added to the mixing drum 112.

Thus, the computing device 116 retrieves data identifying the desired amount of the components (aggregate, RO material, and/or VAO) to be delivered to the mixing drum 112 for a particular asphalt mixture from a database or other data storage location, including the memory 120, and receives data from one or more sensors, including the RO sensor 106, indicating the actual amount of the components (aggregate, RO material, and/or VAO) delivered to the mixing drum. The desired amounts of RO material, VAO, and aggregate may be, for example, pre-determined or pre-defined amounts for an asphalt mixture or amounts stored in a database or calculated by the computing device 116 for an asphalt mixture. The computing device 116 also determines modifications to one or more delivery systems 114A-C to meter (adjust) the amount of material from one or more sources, including at least the VAO pump 110 to pump VAO from the VAO source 108, and transmits one or more signals to the one or more delivery systems or sources 102, 104, 108, including the VAO pump, to meter the amount of material, including at least VAO, delivered to the mixing drum 112. In response to receiving one or more signals from the computing device 116, the receiving delivery system 114A-C or source 102, 104, and 108, including at least the VAO pump 110, meters (adjusts) the amount of material delivered by the delivery system to the mixing drum 112.

By way of example and not limitation, the computing device 116 may retrieve data for a particular asphalt composition that requires 60% aggregate by weight and 40% oil by weight. The computing device 116 also may retrieve or calculate the optimal delivery or flow rate for the aggregate and oil to achieve the desired composition. During the manufacturing process, the computing device 116 receives data from the RO sensor 106 indicating that the delivery or flow of RO material and therefore RO is insufficient to produce an asphalt composition that is 40% weight by volume. For example, the delivery of the RO material may be decreased or stopped. In response, the computing device 116 generates and transmits a signal to the VAO pump 110 to initiate or increase the delivery of VAO to the mixing drum 112 to compensate for the insufficiently delivered RO material. The VAO pump 110 receives the signal and initiates or increases the output of VAO from the VAO source 108 to be delivered to the mixing drum 112.

In another example, the computing device 116 may receive data from the RO sensor 106 indicating that the flow of RO material is increasing or is otherwise sufficient to deliver the necessary amount of RO to the mixing drum. In response, the computing device 116 generates and transmits a signal to the VAO pump 110 to decrease or halt the delivery of VAO to the mixing drum 112. The VAO pump 110 receives the signal and decreases or halts output of VAO from the VAO source 108 to be delivered to the mixing drum.

In other examples, the computing device 116 may receive data from the aggregate sensor 126 regarding the delivery or flow of recycled aggregate material from an aggregate source 102 to the mixing drum 112 and generate signals that are received at the aggregate source or delivery system 114A to increase or decrease the amount of virgin aggregate provided to the mixing drum. In response, the aggregate source 102 or delivery system 114A increases or decreases the amount of aggregate delivered to the mixing drum 112. The computing device 116 may receive data from one or more sensors and adjust the flow of one or more components in real-time, during the manufacturing process.

In one aspect, the computing device 116 includes at least one processor 118 and memory 120. For example, the computing device 116 may be a programmable logic controller (PLC), a personal computer, workstation, server, or mobile device. The processor 118 is a hardware device that processes software, other machine-readable instructions, retrieved data, and/or received data. The memory 120 may store the software or other machine-readable instructions and data. The memory 120 may include volatile and/or non-volatile memory. The memory 120 may comprise a database to store data identifying the desired amounts of RO material, VAO, and aggregate for an asphalt mixture, such as in pre-determined or pre-defined amounts, and a total amount of oil comprised of one or more of virgin oil and recycled oil material. The computing device 116 may further include various hardware and accompanying software components that may be configured for receiving data from one or more of the asphalt component sources 102, 104, 108, and/or one or more sensors, such as the RO sensor 106.

Additionally, the computing device 116 may also include a communication system to communicate with one or more components of the asphalt mixing system 100A, such as the RO sensor 106 and optionally other sensors, sources, and/or delivery systems, over a communication network via wireline and/or wireless communications, such as through the Internet, an intranet, and Ethernet network, a wireline network, a wireless network, and/or another communication network of the asphalt mixing system. The computing device 116 may further include a display (not shown) for viewing data or one or more user interfaces (UI), such as a computer monitor, and an input device (not shown), such as a keyboard or a pointing device (e.g., a mouse, trackball, pen, touch pad, or other device) for entering data and navigating through data, including images, documents, structured data, unstructured data, HTML pages, other web pages, and other data.

The computing device 116 may include a database (not shown) and/or is configured to access the database. The database may be a general repository of data including, but not limited to, user data, asphalt composition mixture data, or any other data related to asphalt production, including data regarding the type and amount of components (aggregate, RO material, and/or VAO) in various asphalt compositions, operating parameters of the various components at an asphalt manufacturing plant, such as processing capacities and rates and delivery system capacities and rates. For example, the database stores data identifying the desired amounts of RO material, VAO, and aggregate for an asphalt mixture, such as in pre-determined or pre-defined amounts. The database may include memory and one or more processors or processing systems to receive, process, query and transmit communications and store and retrieve such data. In another aspect, the database may be a database server.

According to one aspect, the computing device 116 includes a computer readable medium ("CRM") 122, which may include computer storage media, communication media, and/or another available media medium that can be accessed by the processor 118. For example, CRM 122 may include non-transient computer storage media and communication media. By way of example and not limitation, computer storage media includes memory, volatile media, nonvolatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data and includes an information delivery media or system. The CRM 122 may store executable instructions to implement an asphalt constituent mixture application 124 to implement the sensor monitoring and VAO pump operation to meter the VAO. For example, the asphalt constituent mixture application 124 is loaded or stored on the CRM in one example. Generally, program modules include routines, programs, instructions, objects, components, data structures, etc., that perform particular tasks or implement particular abstract data types.

The asphalt mixture application 124 receives sensor data from one or more of the sensors, including the RO sensor 106. The sensor data identifies measured amounts of material. The asphalt mixture application 124 compares the sensor data to pre-defined or calculated data identifying desired amounts of material, determines adjustment amounts (increases, decreases, initiations, or halts) for the VOA to be added to the asphalt mixture, and controls sending one or more signals to the VOA pump 110 to adjust the output of the amount of VOA delivered from the VOA source 108 to the mixing drum 112. For example, one or more of the desired amounts are stored as parameters identifying pre-defined or pre-determined amounts of RO material and/or VOA and/or aggregate to be delivered to the mixing drum 112 for the asphalt mixture.

In one example, the asphalt mixture application 124 retrieves the pre-defined component amount data from the database. The pre-defined component amount data identifies pre-defined or pre-determined amounts of RO material and/or VOA and/or aggregate to be delivered to the mixing drum 112 for the asphalt mixture. The asphalt mixture application 124 receives the measured amount of RO material from the RO sensor and compares the measured amount of RO material to the pre-defined amount of RO material. The asphalt mixture application 124 determines an amount of the VOA needed for the asphalt mixture based upon the comparison of the measured amount of RO material to the pre-defined amount of RO material, such as more, less, none, or at least some. The asphalt mixture application 124 transmits a signal to the VO pump 110 to adjust (initiate, increase, halt, or decrease) a pumped amount of the VOA pumped from the VAO source 108 to be the determined amount.

In another example, the asphalt mixture application 124 receives measurement data of a first oil component added to the asphalt mixture from a sensor. The measurement data identifies a first amount of the first oil component. The application also compares the measurement data to the component parameter data for the asphalt mixture, determines the second amount of a second oil component based upon the measurement data, and transmits an output signal to a metering device in fluid communication with a vessel containing the second oil component, wherein the second amount of the second oil component is added to the asphalt mixture in near real-time.

In one aspect, the computing device 116 with a database, a processor 118, and an asphalt mixture application 124 collectively are referred to as a control system.

The VAO pump 110 has circuitry, hardware, and/or software to receive one or more signals from the computing device 116 and increase, decrease, initiate, or halt the delivery or flow of VAO from the VAO source 108 in response to the one or more signals. Optionally, the aggregate source 102, RO source 104, delivery system 114A, and/or delivery system 114B optionally each have circuitry, hardware, and/or software to receive one or more signals from the computing device 116 and increase, decrease, initiate, or halt the delivery or flow of material from respective sources to the mixing drum in response to the one or more signals.

Figure 1B:
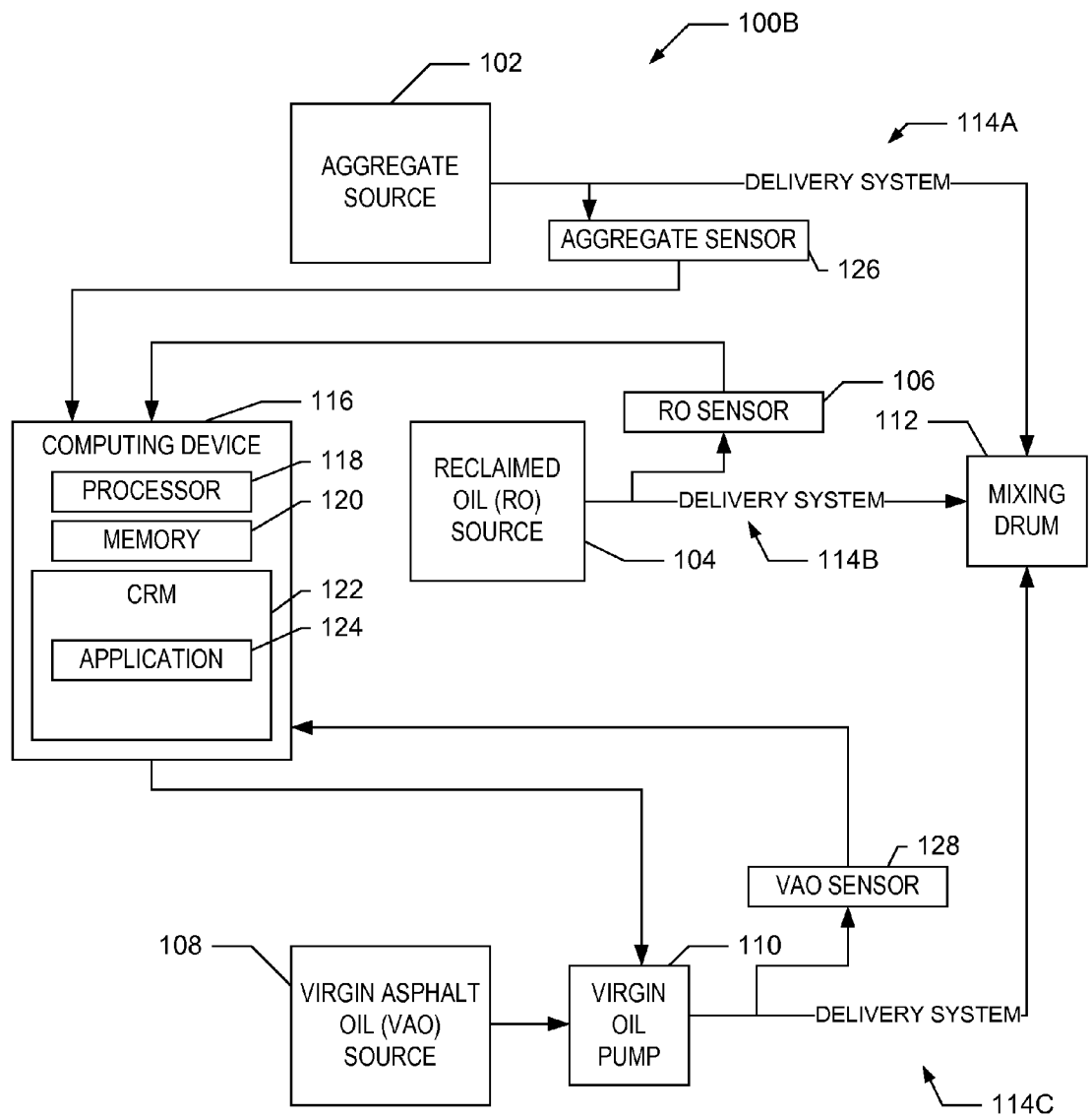
FIG. 1B is a block diagram of an automated asphalt component mixing system according to another aspect.

FIG. 1B depicts another embodiment of the asphalt mixing system, indicated as 100B. In this embodiment, the computing device also receives data regarding the amount of aggregate and VAO actually delivered to the mixing drum 112, from an aggregate sensor 126 and a virgin asphalt oil (VAO) sensor 128. For example, the aggregate sensor 126 may be one or more load cells, weigh depletion sensors, other weight determining sensors, or another type of sensor. The VAO pump 110 may be used to meter the VAO transported by the delivery system 114C, and the VAO sensor 128 may be incorporated along the delivery system 114C to provide additional data regarding the VAO pumped to the mixing drum 112. The VAO sensor 106 may be any suitable sensor or meter, including but not limited to a flow meter, to precisely measure the volume of VAO delivered to the mixing drum 112.

By also monitoring the aggregate and VAO delivered to the mixing drum 112, a user of the asphalt mixing system 100 may ensure that the desired ratios of aggregate-to-oil delivered to the mixing drum 112 are maintained. The user may also be able to identify any deficiencies in the materials provided to the mixing drum 112, which may indicate a blockage or broken machinery in the asphalt plant.

In addition, by monitoring all of the materials intended to enter the mixing drum 112, the user may further change the composition of the asphalt mixture, in real time, to increase or decrease the aggregate-to-oil ratio of the mixture delivered to the mixing drum 112.

Figure 2:
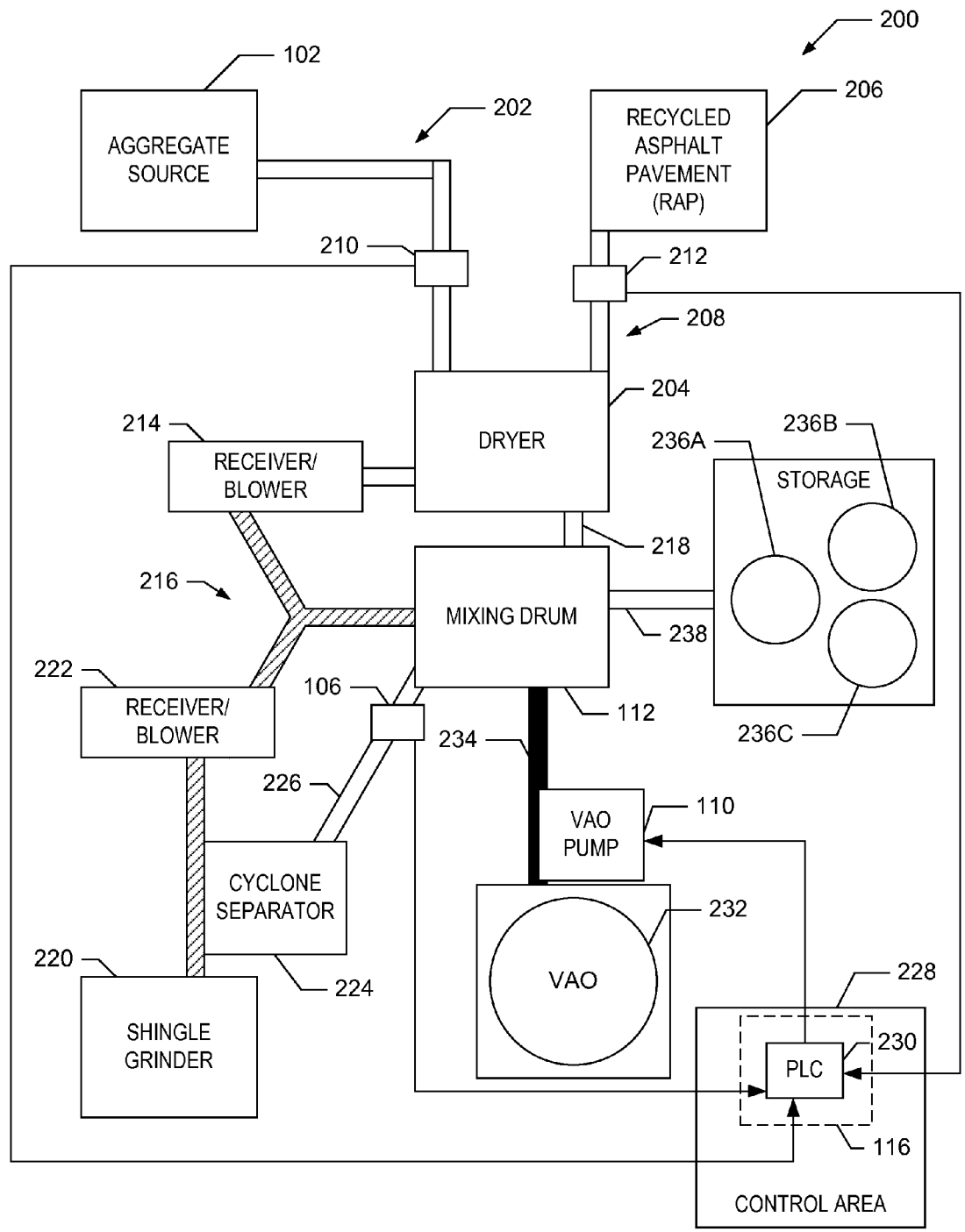
FIG. 2 is a plan view layout of an asphalt manufacturing facility incorporating the asphalt component mixing system according to one aspect.

Referring now to FIG. 2, a plan view layout of an asphalt manufacturing facility 200 incorporating the asphalt mixing system 100 is shown. An aggregate source 102 is in communication with a delivery system 202, such as a conveyor belt, that transports aggregate material to a dryer 204, such as a drying drum. Similarly, aggregate obtained from a RAP source 206, optionally is transported by another delivery system 208, such as a conveyor belt or auger conveyor, to the dryer 204. In one aspect, the virgin aggregate and recycled aggregate derived from RAP may be transported by the same delivery system. The aggregate source 102 and the RAP source 206 each may include one or more cold feed bins or other storage or holding structures containing the respective aggregate material. The cold feed bins are configured to drop quantities of the aggregate and the RAP material onto the respective delivery systems 202 and 208. In one aspect, each delivery system 202 and 208 includes at least one load cell, weigh depletion sensor, or other sensors 210 and 212, respectively to measure the amount of aggregate and RAP material provided to the dryer 204. The RAP source 206, the delivery system 208, and the sensor 212 are optional in some embodiments.

The dryer 204 heats the aggregate material to remove moisture and improve subsequent bonding between the aggregate and the asphalt oil in the mixing drum 112. The dryer 204 may be any dryer or drying drum suitable for heating and drying the aggregate material.

While drying, heated air blown into the dryer 204 extracts large amounts of dust and sand from the heated aggregate mix and carries it to a receiver/blower 214, such as a baghouse, where the air is filtered and the fine particles are collected. These particles are fed back into the mixing drum 112, as generally indicated by 216, to become part of the new asphalt mix. Any suitable configuration for the receiver/blower 214 may be used. The aggregate material remaining in dryer 204 is transferred to the mixing drum 112 via another delivery system 218.

One source of asphalt oil for the asphalt mixture is oil reclaimed from RAS material. In one aspect, roofing shingles are shredded or ground in a shredder or grinder 220. The RAS material is passed through the shredder or grinder 220 in one or more passes. In one example, during a first pass, the RAS material is reduced to pieces approximately ¼" by ¼". In a second pass, the RAS material is further reduced to approximately ⅛" by ⅛". Though in other instances, the RAS material may be ground or shredded in a single pass. In one example, the ground or shredded RAS material is less than approximately ⅛". In another example, the ground or shredded RAS material is between approximately 1/16" to ½".

Similar to the aggregate material, the shredded or ground RAS material is carried to a receiver/blower 222, such as a baghouse, where the dust is filtered and collected. In one aspect, the entirety of the RAS material is filtered though the receiver/blower 222, before being carried to the mixing drum 112. In another aspect, a cyclone separator 224 is used is used to remove larger pieces of the RAS material by cyclonic separation, before the fine dust particles are carried to the receiver/blower 222. The larger pieces are carried by a delivery system 226 to the mixing drum 112. The delivery system 226 may be configured as a conveyor belt, a hopper-belt conveyor, an auger conveyor, or a pneumatic conveyor, among others.

Due to the small particle size of the pulverized (e.g. ground or shredded) RAS material, there is a potential for the RAS material to clump, thereby by causing intermittent or partial blockages of the delivery system 226. For example, the RAS material may clog an auger-based delivery system. Therefore, despite weighing the RAS material after grinding or shredding, the amount of RAS material actually delivered to or being fed into the mixing drum 112 may not be a constant value and may vary from the calculated or pre-determined or pre-defined value. As such, the amount of RO delivered to the mixing drum 112 may vary.

To account for variance in the amount of RAS material delivered to the mixing drum 112, the amount of RAS material is measured by one or more sensors, such as the RO sensor 106. In one embodiment, the RO sensor 106 is a weigh depletion sensor or load cell that determines the weight of the RO material delivered to the mixing drum 112 For example, a weigh depletion sensor, such as one or more load cells, measures or determines weights of a storage or holding bin or device in which material is stored or held and determines the amount of material dispersed from the bin or device by measuring or determining the change in weight or mass of the bin or device. In this embodiment, the weight and oil content of the RAS material is known or at least determined prior to processing the shingles. Subsequent measurements of the weight of the RAS material may be used to determine the actual amount of RAS material delivered to the mixing drum, and therefore determine the amount of RO delivered to the mixing drum 112. While it is believed that weight depletion is one method of determining the amount of RAS delivered to the mixing drum, other methods may be used, including but not limited to, monitoring the depletion level within a pulverized RAS cold-feed storage bin, weighing material on or passing over or through the delivery system, etc.

In one aspect, the data from the RO sensor 106 is transmitted to the computing device 116, located in a control area 228, such as a building. Although shown in a detached control area 228, the computing device 116 may be located in any suitable location. The computing device may be configured to receive and transmit data by a wired connection or by a wireless connection to the one or more sensors, such as the RO sensor 106.

In one embodiment, the computing device 116 is a programmable logic controller (PLC) 230 that has been specially programmed to adjust the output of the VAO pump 110, in real-time, in response to the data received from the RO sensor 106. For example, when the PLC 230 determines the weight and therefore amount of the RAS material delivered to and entering the mixing drum 112 decreases or is otherwise insufficient to provide the desired amount of RO, the PLC automatically and simultaneously adjusts the output of the VAO pump 110 to increase the flow of VAO from the VAO storage tank(s) 232 or other VAO source through the delivery system 234 and into the mixing drum 112. Conversely, when the PLC 230 determines that the weight and therefore amount of the RAS material delivered to and entering the mixing drum 112 is increasing or is otherwise sufficient to provide the desired amount of RO, the PLC automatically and simultaneously adjusts the output of the VAO pump 110 to decrease, maintain, or stop the flow, as needed, of VAO from the VAO storage tank(s) 232 or other VAO source into the mixing drum 112. Therefore, to maintain the desired oil content in the mixing drum 112, the amount of VAO is automatically varied, in real-time, to account for variance in the amount of RO delivered to and entering the asphalt mixture in the mixing drum 112. The desired amounts of RO, VAO, and aggregate may be, for example, pre-determined or pre-defined amounts for an asphalt mixture or amounts calculated by the PLC 230 for an asphalt mixture.

Thus, the PLC 230 retrieves data identifying the desired amounts of the components (aggregate, RO material, and/or VAO), such as from a database, to be delivered to the mixing drum 112 for a particular asphalt mixture from a database or other data storage location, including memory of to the PLC and receives data from one or more sensors, including the RO sensor 106, indicating the actual amounts of the components (aggregate, RO material, and/or VAO) delivered to the mixing drum. The PLC 230 also determines modifications to one or more delivery systems 202, 208, 218, 226, and 234 to meter (adjust) the amount of material from one or more sources, including at least the VAO pump 110 to pump VAO from the VAO source 232, and transmits one or more signals to the one or more delivery systems or sources 102, 104, 108, including at least the VAO pump 110 to meter the amount of VAO material delivered to the mixing drum 112. In response to receiving the signal from the PLC 230, the receiving delivery system 202, 208, 218, 226, 234 or source 102, 206, 220, and 232, including at least the VAO pump 110, meters (adjusts) the amount of material delivered by the delivery system to the mixing drum 112.

By way of example and not limitation, the PLC 230 may retrieve pre-defined or pre-determined or pre-defined data identifying amounts for a specific asphalt composition (mixture) that requires 75% aggregate by weight and 25% oil by weight. The PLC 230 also may retrieve or calculate the optimal flow or delivery rate for the aggregate and oil to achieve the desired composition. During the manufacturing process, the PLC 230 receives data from the RO sensor 106 indicating that the flow of RO material and therefore the amount of RO is decreasing or is insufficient to produce an asphalt composition that is 25% weight by volume. In response, the PLC 230 generates and transmits a signal to the VAO pump 110 to initiate or increase the delivery of VAO to the mixing drum 112. For example, the signal may indicate the VAO pump 110 must increase output by 50%. The VAO pump 110 receives the signal and initiates or increases the output of VAO accordingly.

In another example, the PLC 230 may receive data from the RO sensor 106 indicating that the flow of RO material is increasing or is otherwise sufficient to deliver the necessary amount of RO to the mixing drum. In response, the PLC 230 generates and transmits a signal to the VAO pump 110 to decrease or halt the delivery of VAO to the mixing drum 112. For example, the signal may indicate the VAO pump 110 must decrease the output of VAO by 50%. The VAO pump 110 receives the signal and decreases the output of VAO accordingly.

In other examples, the PLC 230 may receive data from the sensor 212 regarding the flow of recycled aggregate material from the RAP source 206 to the mixing drum 112 and generate signals that are received at the aggregate source 102 or delivery system 202 to increase or decrease the amount of virgin aggregate provided to the mixing drum. The aggregate source 102 or delivery system 202 receives the signal and adjusts the amount of aggregate delivered to the mixing drum 112 accordingly. The PLC 230 may receive data from one or more sensors and adjust the flow of one or more components in real-time, during the manufacturing process.

In other embodiments, the PLC 230 may receive data from additional sensors such as the aggregate sensor 126, the VAO sensor 128, and a RAP sensor 212. For example, the aggregate sensor 126 or the RAP sensor 212 may be load cells or weigh depletion sensors to weigh the respective aggregate materials delivered to the asphalt mixture or other sensor types to determine an amount of material delivered to the asphalt mixture. Moreover, although RAP may be used as an aggregate constituent to reduce the amount of virgin aggregate in the asphalt mixture, RAP may contain a significant amount of RO, which may impact the oil content of the asphalt mixture. Therefore, in one aspect, the computing device 116 may rely upon input from the RAP sensor 212 to adjust the input of virgin aggregate and/or VAO due to the aggregate and/or RO contributions, respectively, of the RAP.

By way of example and not limitation, the weight of the RAP may be determined as it passes the RAP sensor 212 before it is ultimately delivered to the mixing drum 112. The RAP sensor 212 measures the weight of the RAP delivered by the delivery system 208 and transmits the data to PLC 230, where the amount of virgin aggregate from the aggregate source 102 is adjusted accordingly. In one example, RAP is fed into the dryer 204 by the delivery system 208. In another example, RAP is delivered directly to the mixing drum 112 by the delivery system 208 and is not fed into the dryer 204.

In an embodiment, the PLC 230 therefore monitors and adjusts, in real-time, the combined aggregate input consisting of virgin aggregate and optionally recycled aggregate from the RAP, as well as the combined asphalt oil input consisting of oil contained in the RAS material and the VAO to produce a new asphalt mixture composition. As a result, the new asphalt mixture composition has maximized quantities of recycled material from the RAS and optionally RAP, while minimizing the amount of higher-cost virgin materials, such as the VAO and virgin aggregate. Moreover, the PLC 230 may be reprogrammed quickly and efficiently to modify the aggregate-to-oil ratio of the asphalt mixture, in response to legislative, industry, or specific application demands. For example, in one embodiment where the RAP material is reclaimed only as an aggregate source, the amount of VAO delivered to the mixing drum 112 is based on the availability of RO from the RAS. Conversely, in an embodiment where oil is reclaimed from the RAP material, the amount of VAO delivered to the mixing drum 112 is based on the total amount of recycled oil reclaimed from the RAS and RAP materials.

After the desired quantities of aggregate and oil have been delivered to the mixing drum 112, new asphalt is produced and transferred to one or more storage silos 236A-C by the delivery system 238 for storage. The asphalt mixing system 100 may be configured to vary the aggregate-to-oil ratio of the new asphalt during production, such that multiple and varied compositions of asphalt may be produced in rapid succession and stored in the one or more storage silos 236A-C.

Figure 3:
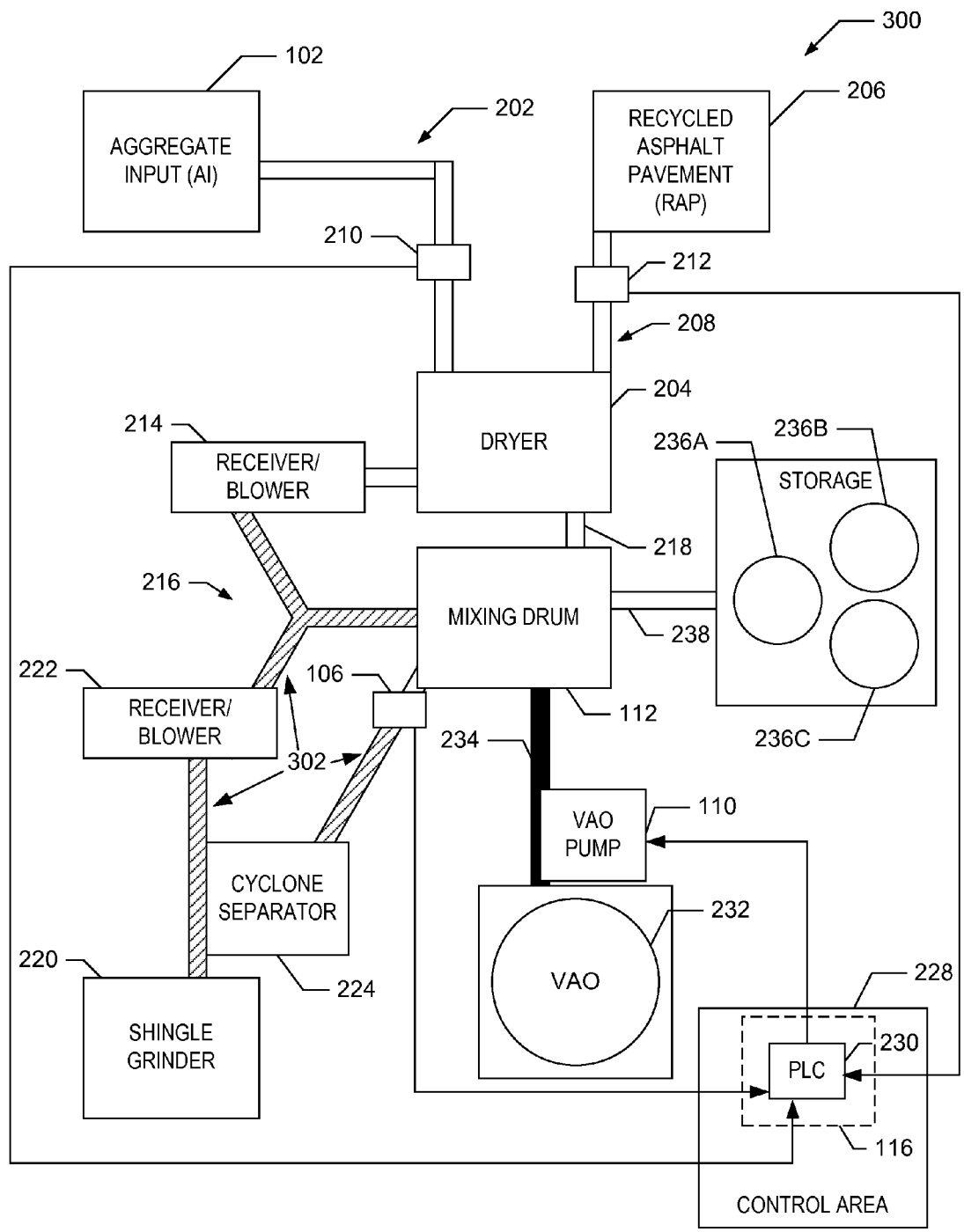
FIG. 3 is a plan view layout of an asphalt manufacturing facility incorporating the asphalt component mixing system according to another aspect.

FIG. 3 depicts another asphalt manufacturing facility 300 incorporating the asphalt mixing system 100. In this embodiment, the pulverized (e.g. ground or shredded) RAS material is transported predominately by a pneumatic system, indicated generally as 302. The pneumatic system 302 is configured to maximize the RAS material provided to the mixing drum 112 and minimize the potential for clogging. Regardless of the manner in which the RAS material is transported, the amount of RAS material delivered to the mixing drum 112 is monitored in real-time.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Those skilled in the art will appreciate that variations from the specific embodiments disclosed above are contemplated by the invention. The following invention should not be restricted to the above embodiments, but should be measured by the following claims.

The invention claimed is:

1. A method of preparing an asphalt mixture comprising a recycled oil component, said method comprising:
   shredding or grinding roofing shingles in a shredder or grinder to yield a pulverized recycled asphalt shingle material, wherein said roofing shingles are reduced to a particle size of less than approximately 1/8", wherein said pulverized recycled asphalt shingle material comprises an amount of recycled oil;
   delivering said pulverized recycled asphalt shingle material to a mixing drum, wherein a sensor measures the amount of recycled oil from said pulverized recycled asphalt shingle material delivered to the mixing drum;
   delivering an aggregate material to said mixing drum; and
   delivering an optional amount of virgin asphalt oil to said mixing drum based upon the amount of recycled oil measured by said sensor and delivered to the mixing drum to achieve a total desired oil amount in said mixing drum, wherein the total desired oil amount comprises the recycled oil amount and optional virgin oil amount;
   thereby producing said asphalt mixture.

2. The method of claim 1, wherein said roofing shingles are shredded or ground in a single pass through said shredder or grinder to reduce said roofing shingles to said particle size of less than approximately 1/8".

3. The method of claim 1, further comprising increasing or decreasing the amount of virgin asphalt oil delivered to said mixing drum depending upon the amount of recycled oil measured by said sensor.

4. The method of claim 1, wherein said sensor is a load cell or weigh depletion sensor.

5. The method of claim 1, wherein said aggregate comprises ground recycled asphalt pavement.

6. The method of claim 1, wherein said aggregate comprises virgin aggregate.

7. The method of claim 1, further comprising monitoring and adjusting the asphalt mixture, said method comprising:
   at least one processor:
      receiving measurement data of the recycled oil amount from said sensor;
      comparing the measurement data to component amount data for the asphalt mixture stored in a memory accessible by the at least one processor, the component amount data identifying the total desired oil amount, wherein the total desired oil amount comprises the recycled oil amount and virgin oil amount;
      determining an amount of virgin oil based upon a comparison between the measurement data and component amount data for the asphalt mixture, such that the recycled oil amount and virgin oil amount equal the total desired oil amount; and
      transmitting an output signal to a metering device in communication with a vessel containing the virgin oil, wherein the output signal adjusts an output of virgin oil to be added to the asphalt mixture in the mixing drum.

8. The method of claim 7, wherein the output signal increases the amount of virgin oil.

9. The method of claim 7, wherein the output signal decreases the amount of virgin oil.

10. The method of claim 7, wherein when the amount of recycled oil is equal to the total desired oil amount, said method further comprising:
transmitting a second output signal to the metering device to stop the addition of virgin oil to the mixing drum.

11. The method of claim 7, wherein the metering device comprises a pump.

12. The method of claim 1, wherein said pulverized recycled asphalt shingle material is delivered to said mixing drum by at least one of an augur delivery system, a pneumatic delivery system, or a conveyor-belt delivery system.

13. The method of claim 1, wherein said pulverized recycled asphalt shingle material is delivered directly to said mixing drum from said shredder or grinder.

14. A method of preparing an asphalt mixture comprising a recycled oil component, said method comprising:
shredding or grinding roofing shingles in a shredder or grinder to yield a pulverized recycled asphalt shingle material, wherein said roofing shingles are reduced to a particle size of less than approximately ⅛", wherein said pulverized recycled asphalt shingle material comprises an amount of recycled oil;
delivering said pulverized recycled asphalt shingle material to a mixing drum, and monitoring the amount of recycled oil delivered to said mixing drum in real-time;
delivering an aggregate material to said mixing drum; and
delivering an optional amount of virgin asphalt oil to said mixing drum based upon the amount of recycled oil delivered to said mixing drum in real-time to achieve a total desired oil amount in said mixing drum, wherein the total desired oil amount comprises the recycled oil amount and optional virgin oil amount;
thereby producing said asphalt mixture.

15. The method of claim 14, wherein said roofing shingles are shredded or ground in a single pass through said shredder or grinder to reduce said roofing shingles to said particle size of less than approximately ⅛".

16. A method of preparing an asphalt mixture comprising a recycled oil component, said method comprising:
shredding or grinding roofing shingles in a shredder or grinder to yield a pulverized recycled asphalt shingle material, wherein said roofing shingles are reduced to a particle size of less than approximately ⅛", wherein said pulverized recycled asphalt shingle material comprises an amount of recycled oil;
delivering said pulverized recycled asphalt shingle material to a mixing drum;
delivering an aggregate material to said mixing drum; and
delivering an optional amount of virgin asphalt oil to said mixing drum, thereby producing said asphalt mixture;
said method further comprising monitoring and adjusting said asphalt mixture, comprising: at least one processor: receiving measurement data of the recycled oil amount from a sensor; comparing the measurement data to component amount data for the asphalt mixture stored in a memory accessible by the at least one processor, the component amount data identifying a total desired oil amount, wherein the total desired oil amount comprises the recycled oil amount and virgin oil amount; determining an amount of virgin oil based upon a comparison between the measurement data and component amount data for the asphalt mixture, such that the recycled oil amount and virgin oil amount equal the total desired oil amount; and transmitting an output signal a metering device in communication with a vessel containing the virgin oil, wherein the output signal adjusts an output of virgin oil to be added to the asphalt mixture in the mixing drum.

17. The method of claim 16, wherein said roofing shingles are shredded or ground in a single pass through said shredder or grinder to reduce said roofing shingles to said particle size of less than approximately ⅛".

18. The method of claim 16, wherein the output signal increases or decreases the amount of virgin oil.

19. The method of claim 16, wherein when the amount of recycled oil is equal to the total desired oil amount, said method further comprising:
transmitting a second output signal to the metering device to stop the addition of virgin oil to the mixing drum.

* * * * *